United States Patent [19]
Aksberg

[11] Patent Number: 5,792,354
[45] Date of Patent: Aug. 11, 1998

[54] FILTER WELL AND METHOD FOR ITS MANUFACTURE

[75] Inventor: Arvi Aksberg, Lidingö, Sweden

[73] Assignee: Pharmacia Biotech AB, Uppsala, Sweden

[21] Appl. No.: 693,095

[22] PCT Filed: Feb. 10, 1995

[86] PCT No.: PCT/SE95/00141

§ 371 Date: Aug. 9, 1996

§ 102(e) Date: Aug. 9, 1996

[87] PCT Pub. No.: WO95/21678

PCT Pub. Date: Aug. 17, 1995

[30] Foreign Application Priority Data

Feb. 10, 1994 [SE] Sweden ................................ 9400437

[51] Int. Cl.⁶ .................... B01D 29/01; B01D 63/08; B29C 33/42
[52] U.S. Cl. ............... 210/406; 210/321.75; 210/321.84; 210/446; 210/455; 210/482; 210/483; 264/219; 264/DIG. 48; 216/41; 216/48; 216/94; 216/100; 216/101
[58] Field of Search ................. 210/232, 321.75, 210/321.84, 406, 446, 489, 455, 483, 482; 264/219, DIG. 48; 216/41, 48, 94, 100, 101

[56] References Cited

U.S. PATENT DOCUMENTS

| | | |
|---|---|---|
| 3,967,620 | 7/1976 | Noiles . |
| 4,640,777 | 2/1987 | Lemonnier . |
| 5,269,917 | 12/1993 | Stankowski . |
| 5,273,718 | 12/1993 | Sköld et al. . |
| 5,443,723 | 8/1995 | Stankowski . |
| 5,454,951 | 10/1995 | Hoopman . |

*Primary Examiner*—Thomas M. Lithgow
*Attorney, Agent, or Firm*—Birch, Stewart, Kolasch & Birch, LLP

[57] ABSTRACT

In a filter well having an inlet portion and an outlet portion and a filter arranged between these, the filter is carried by a support surface having a number of flow channels, extending radially towards an outlet. The ridges between the flow channels have a width of not more than about 0.2 mm whereby essentially the entire upper surface of the filter becomes active at filtration. The filter well is formed by forming of plastic in a forming device, whereby the flow channel pattern in the support surface for the filter is formed by a forming part in the forming device, wherein a negative corresponding to the flow channel pattern has been made in the surface of the forming part by a photolithographic etching process or by laser machining.

13 Claims, 3 Drawing Sheets

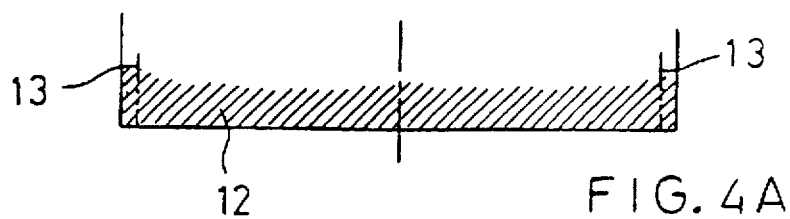
FIG. 4A
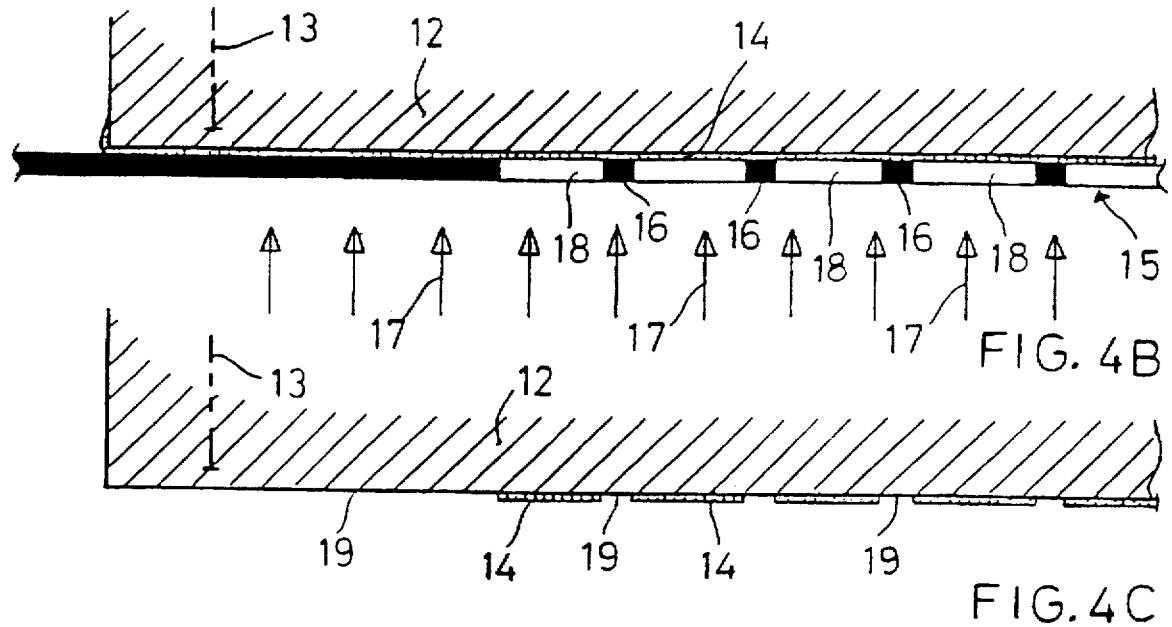
FIG. 4B
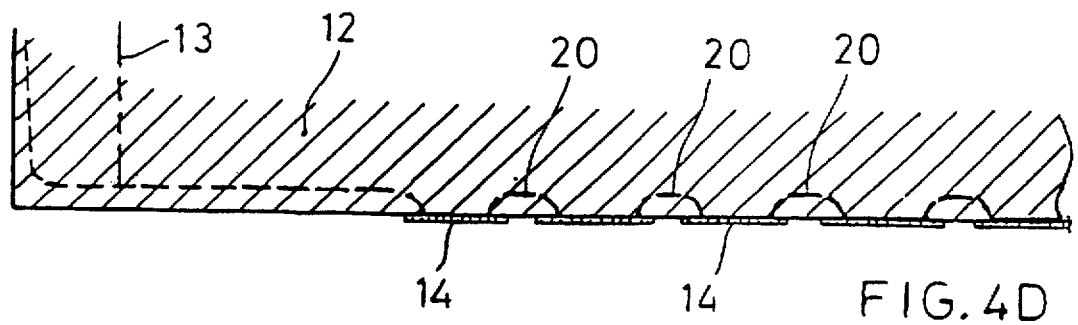
FIG. 4C
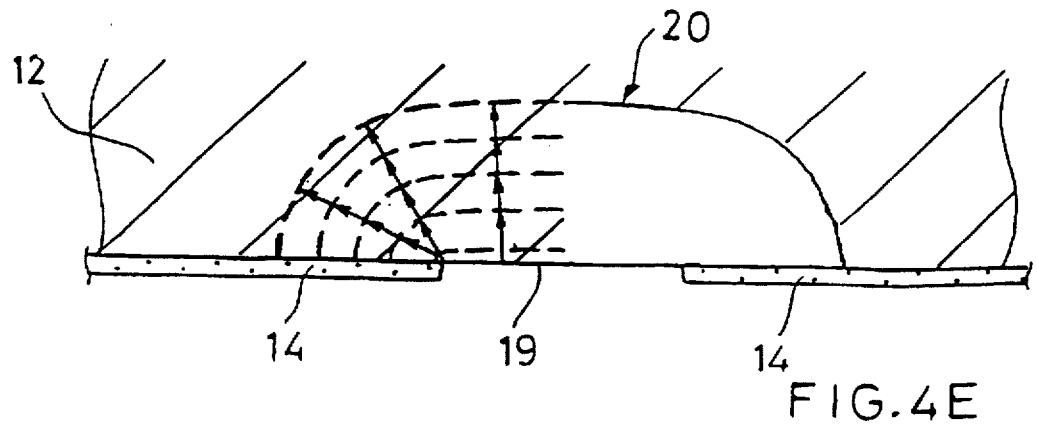
FIG. 4D
FIG. 4E

FILTER WELL AND METHOD FOR ITS MANUFACTURE

The present invention relates to filter wells which are useful for the separation of a solid phase from a liquid as well as to a method for their production.

1. Field of the Invention

Separation of solid phase from a solution is an ordinary action in the biotechnical laboratory and is mainly carried out either by centrifugation or by collecting the solid phase on a filter. As examples can be mentioned preparation of nucleic acids from bacteria, bacteriophages, DNA-synthesis, PCR-products etc. Such a filtration is usually carried out in so called filter wells or filter tubes, i.e. a small tube or the like, open at both ends and containing a filter through which the liquid phase is forced by applying a vacuum on the underside of the filter or a pressure on its upper side.

2. Description of the Related Art

A device for carrying out biochemical reactions in microtitre plates where a solution is forced through filter wells by means of gas pressure is disclosed in our U.S. Pat. No. 5,273,718. In comparison with application of a vacuum, the use of a positive pressure on the upper side of the filter has, among other things, the advantage that both the solid phase and the liquid phase can be collected in a simple manner. It is further possible to use a greater pressure difference (i.e. greater than 1 bar) between the underside and the upper side of the filter.

Depending on the mechanical properties of the filter it may be necessary, especially at greater pressure differences, that the filter rests on the surface of a support fitted to the wall of the tube. As in the case of chromatography columns this filter support can be a bottom portion having a central outlet opening towards which a number of radial channels made in the support surface extend, e.g. in a star or spoke-like manner, for example as disclosed in GB-A-1.102.497 (which, however, relates to a water conduit filter).

A channel pattern of this kind shall, on one hand, have a sufficiently large area/volume to give an acceptable volume flow through the filter, but, on the other hand, it shall have as small volume as possible, since it is often a case of filtering and collecting very small volumes of liquid. The filter usually has such a porosity that it is air-proof, when the liquid has passed, and the liquid volume remaining on the underside of the filter can thus not be forced out of the filter well by gas pressure.

The capacity of the filter is also influenced by the effective filter area, i.e. the area of the filter which is not in contact with the support surface, which means that the support surface should be minimized.

The design of the channel pattern in the support surface will thus necessarily be based on a compromise between the above mentioned desires. The filter well constructions which have been available up to now have, however, not been entirely satisfactory, neither with regard to residual liquid volume nor with regard to an efficient utilization of the filter area.

At the production of these known constructions (generally by injection moulding) the recess pattern in the steel surface in question of the forming tool, which corresponds to the pattern of the desired support surfaces, has usually been made by means of so-called spark machining with a carbon electrode. Among other things this has meant that it has not been possible to make more narrow recesses in the tool than about 0.4 mm and thus not more narrow support ridges between adjacent flow channels in the bottom of the filter well. An example of a filter which has a support surface provided with a channel pattern having such ridge dimensions, but where these are fully satisfactory for the intended uses of the filter is described in GB-A-2.149.315.

SUMMARY OF THE INVENTION

According to the present invention it has been found that a more efficient filter support surface with regard to residual liquid can be obtained if the flow channel pattern is designed more densely and with finer and more shallow channels and ridges, or ribs, in between than for the known support surface constructions. More precisely these support ridges shall, according to the invention, have a sufficiently small width for those parts which are in contact with the filter to make essentially the whole upper surface of the filter effective, i.e. filtration will be carried out over the whole filter surface.

This can be achieved also for thin filters if the ridges have a width of not more than about 0.2 mm, preferably not more than about 0.1 mm. "Width" hereby means the cross extension of the ridges at their broadest section. According to a preferred embodiment the upper parts of the ridges are rounded and/or have a coarse surface, i.e. they are rough, in order to reduce the area of contact with the filters. With a filter support surface of this kind a very efficient utilization of the filter can be obtained even for thin filters and at the same time a very small retained liquid volume (dead volume) after the filtration, but still with an acceptable volume flow through the filter.

A suitable distance between the support ridges is from about 0.4 mm to about 0.1 mm. Such short distances prevent the filter from sinking into the channels and the channels can thus be made very shallow. Preferably the flow channels have a depth of not more than about 0.1 mm, especially to about 0.05 mm or still less.

The ratio between the channel surface and the ridge surface can vary within wide limits but is preferably from about 4:1 to about 1:4, particularly from about 4:1 to 1:1.

The bottom of the flow channels should be smooth to give a small flow resistance. The bottom portions preferably have a surface fineness (or profile depth) of less than about 0.4 µm, especially to about 0.1 µm or still finer.

The desired pattern in the tool for forming the support surface can be obtained by laser machining, but according to the invention it is preferably obtained by etching. In this latter case the inability of etching processes to etch recesses with straight side edges is namely utilized in an advantageous manner. The etch thus directly gives the desired curved or rounded contour of the recess in the tool, which in turn gives a rounded upper part to the ridges in the produced support surface of the filter well. The advantageous smooth bottom surface of the flow channels is also achieved at the same time. An example of photolithographic production of a forming surface is disclosed in JP-A-62-117706.

The invention will in the following be described more in detail with regard to a particular, non-limiting embodiment.

BRIEF DESCRIPTION OF THE DRAWINGS

FIGS. 4A–4F show schematically different sub-steps at the production of a tool element for forming a flow channel pattern in the bottom of a filter well according to the invention.

DETAILED DESCRIPTION OF THE PREFERRED EMBODIMENTS

Figure 1:
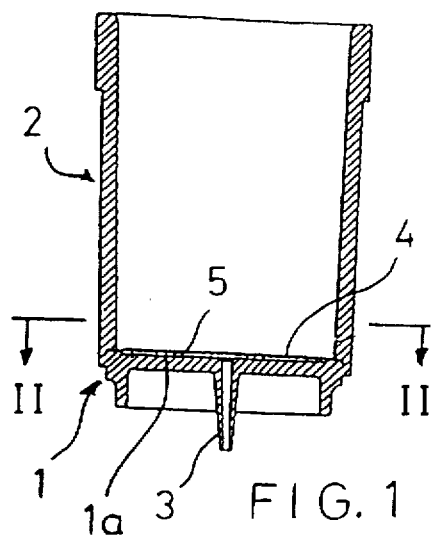
FIG. 1 is a cross sectional view of a filter well according to the invention.

The filter well in FIG. 1, which is intended to allow a liquid to be forced through the filter by means of a positive pressure on the upper side, consists of a bottom portion 1 and a cylindrical portion 2, for example of polypropylene. The bottom portion 1 has a central outlet 3 and carries a filter 4, for example based on polyamide, within the cylindrical portion 2. The filter support surface 1a of the bottom portion 1 has a flow channel system 5 which conducts liquid which has passed through the filter 4 to the outlet 3. In the illustrated case the bottom portion 1 and the cylindrical portion 2 form an integrated unit with the filter 4 fused into the wall of the filter well. A filter well of this kind can be produced by first injection moulding the bottom portion 1, applying the filter 4 on the bottom portion and then injection moulding the cylindrical portion 2 to the bottom portion 1. This is described more in detail in our PCT-application PCT/SE 15/00140 filed on Feb. 10, 1995 entitled, "Method for the manufacture of filter wells" of even date and based on the Swedish patent application 9400436-3 (the content of which is hereby incorporated by reference).

Figure 2:
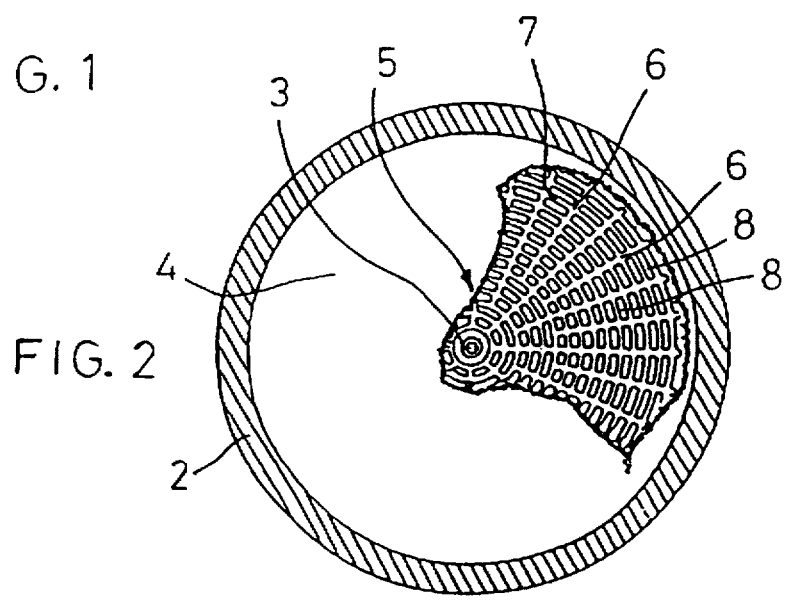
FIG. 2 is a section (in a larger scale) along A—A in FIG. 1 where the filter has been partly cut away.

With reference to FIG. 2, the flow channel system 5 formed in the bottom portion 2 consists of a fine pattern of liquid flow channels 6 which extend radially (or in spoke-form) to the outlet opening 3. In the shown embodiment there are also a number of cross channels 7 which run concentrically with the opening 3. The parts 8 of the surface of the bottom portion which delimit the flow channels 6, 7 and thus form support for the filter 4 will in the following be termed ridge parts or ridges.

The small dimensions of the channels and ridges are characteristic for the flow channel system 5. For reasons which will be explained below the size of the ridges 8 is critical for the invention and the ridges shall in the part of the ridge which is in contact with the filter 4 have a width of not more than about 0.2 mm, preferably about 0.2 mm to about 0.05 mm, for example from about 0.1 mm to about 0.05 mm. The upper parts of the ridges 8 (see FIG. 3) are preferably rounded and/or rough. In the last-mentioned case a certain lateral transport of liquid can be allowed and the demands on rounded upper parts of the ridges are then reduced.

As an example of a suitable channel width, about 0.4 to 0.05 mm, e.g. 0.1 mm can be mentioned but broader or more narrow channels are of course also possible depending on the thickness and properties of the filter 4. A suitable channel depth herein is from about 0.1 mm and less, e.g. as little as about 0.05 mm. The ratio between the channel area and the ridge area can for example be from about 80:20 to about 50:50. Even if not specifically shown here it might be advantageous to have the depth of the flow channels increase gradually (stepwise or continuously) towards the outlet opening 3.

Figure 3:
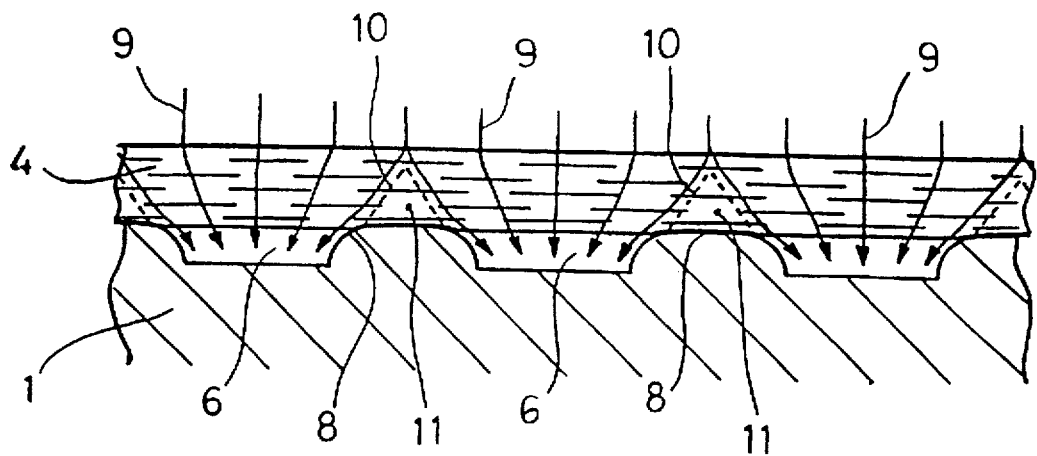
FIG. 3 is a schematic partial cross sectional view of the filter portion of a filter well according to the invention intended to illustrate liquid flow through the filter.

In FIG. 3 liquid flow through the filter 4 influenced by a positive pressure is shown schematically, indicated by arrows 9. As indicated by broken lines 10, an area 11 (which in this case becomes prism-shaped) through which the liquid does not flow and which consequently does not become active at the filtration is formed in those parts of the filter 4 which are in direct contact with the ridges 8. Owing to the above mentioned small dimensions of the ridges 8, as well as to their rounded or alternatively rough upper parts which further reduce the contact area with filter 4, these inactive parts 11 of the filter become very small and essentially the entire filter area is active at the filtration. As readily understood it is essential that the filter has a large active surface since there is otherwise a risk of more rapid clogging.

At the same time as the entire upper surface of the filter becomes active at the filtration sufficient support for the filter can still be achieved in order to stand filtration also at pressures higher than 1 bar. The required support surface is of course dependent on the properties of the filter, but for a given filter it is principally always possible, depending on the "cross flow angle" and the thickness of the filter, to adapt the proportions between channels and ridges, or "support protrusions" so to speak, so that a sufficient support is obtained at the same time as the entire upper surface (about 100%) becomes active.

The required forming surface for forming the fine channel pattern in the bottom of the filter well in a tool for forming the above described filter well, for example by injection moulding, can be produced by laser machining but is advantageously produced by photolithography, as described in the following with reference to FIGS. 4A–4F.

FIG. 4A schematically illustrates the end 12 of a tool unit of steel which is to be etched to produce a desired relief pattern corresponding to the desired flow channel pattern in the bottom of the filter well. The finely honed (which means a profile depth of less than about 0.4 μm, preferably about 0.1 μm or less) and flat end 12 has a somewhat greater diameter than the final diameter on the finished part of the tool, indicated by broken lines 13.

The tool end 12 is coated with a UV-curable so-called photoresist 14, as illustrated in FIG. 4B for a part of the tool end 12. A film 15 with the desired pattern is then contact copied on the photoresist whereby the portions corresponding to the support surfaces (the ridges 8 in FIG. 2) for the filter are black on the film, designated by reference numeral 16.

At exposure to UV-light 17 the photoresist is cured under the transparent parts 18 of the film, while the photoresist under the black parts 16 is not exposed. The unexposed photoresist portions can then be washed away in a development process so that the steel end 12 of the tool gets the appearance shown in FIG. 4C with exposed steel portions 19 which correspond to the portions of the photoresist which have been washed away.

The tool end 12 is then immersed in an etch bath whereby the exposed steel parts are etched isotropically, i.e. in all directions, while the parts which are covered by the etch resistant photoresist are not affected. The etching is allowed to proceed until recesses 20 having the desired depth have been obtained, as shown in FIG. 4D. Owing to the isotropic etching process the recesses 20, which will form the ridges or the "support protrusions" in the filter support surface, get a curved or rounded form, the advantages of which have been explained above. The gradual isotropic etching process is more clearly illustrated in FIG. 4E.

Figure 4F:
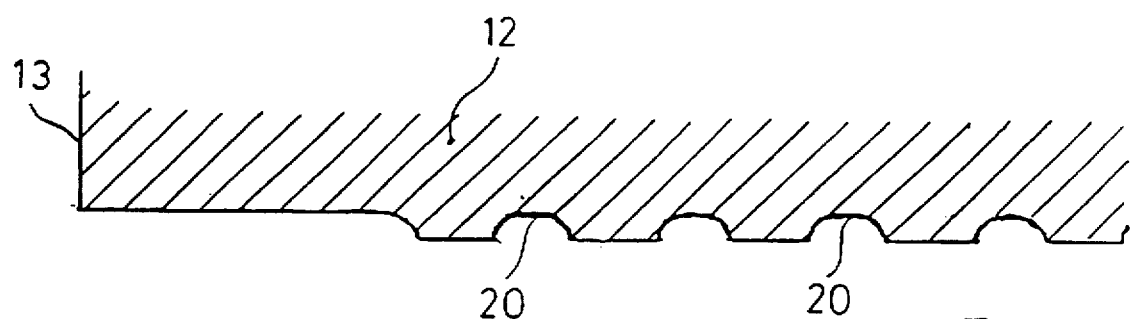

When the etching is finished all remaining photoresist is removed. A part of the resulting tool end 12 with the desired pattern of recesses 20 is shown in FIG. 4F. A centre hole is then made for insertion of a forming element which will form the outlet 3 of the filter well and the outer edge is honed to the desired outer diameter 13. The finished tool element can then be mounted in the tool for forming the filter well. This tool can for example be a tool as described in our above mentioned PCT-application "Method for the manufacture of filter wells" of even date.

Figure 5:
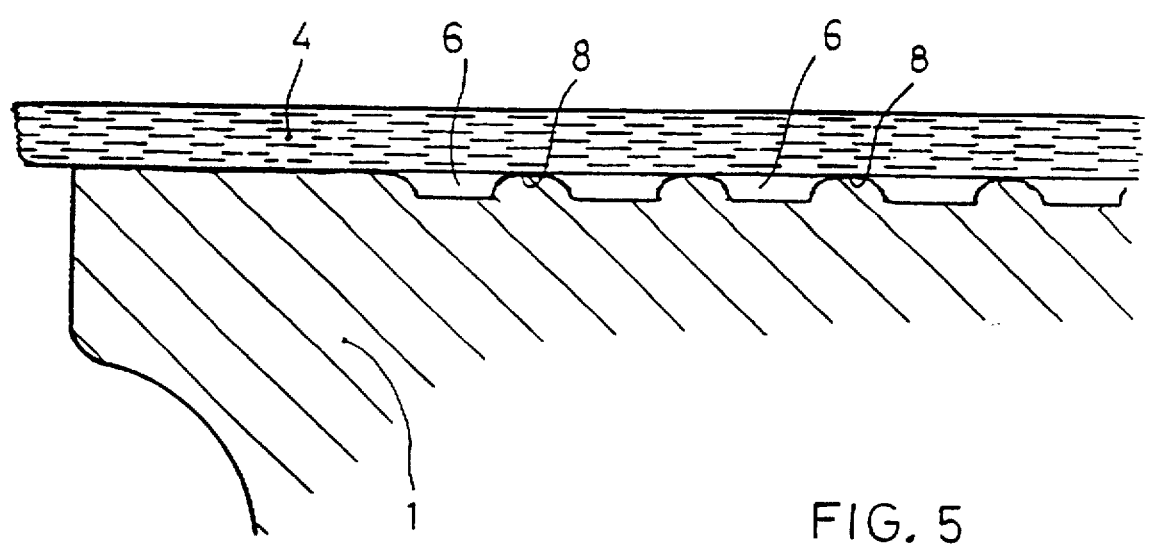
FIG. 5 shows schematically a partial cross section of a peripheral filter portion in a filter well, the bottom part of the well having been formed with the tool element produced according to FIGS. 4A–4F before injection moulding of the cylindrical portion of the filter well.

A part of the finished bottom portion of the filter well is shown in FIG. 5 where corresponding reference numerals as in FIG. 1 and 2 have been used. The filter 4 rests on ridges 8 corresponding to the recesses 20 in the steel end 12, while flow channels 6 in the filter support surface have been formed from the unetched parts between the recesses 20 in the tool end 12. As readily understood, the flow channels 6 will get a very smooth bottom which facilitates the liquid flow.

The invention is of course not limited to the embodiment particularly disclosed above and shown in the drawings, but many modifications and changes can be made within the scope of the general inventive concept, as it is set forth in the appended claims.

I claim:

1. A filter well having an inlet portion and an outlet portion and a filter arranged between these, wherein said filter is supported by a support surface in which there is a number of flow channels extending radially towards an outlet, wherein ridges are located between the flow channels, the upper parts of which ridges are rounded and in contact with the filter, and the ridges have a width of not more than about 0.2 mm, whereby essentially the entire upper surface of the filter becomes active at filtration.

2. The filter well according to claim 1, wherein the ridges have a width of not more than about 0.2 to about 0.05 mm.

3. The filter well according to claim 2, wherein the ridges have a width of about 0.1 mm to about 0.05 mm.

4. The filter well according to claim 1, wherein the upper parts of the ridges have a coarse surface.

5. The filter well according to claim 1, wherein the flow channels are mutually connected via cross channels.

6. The filter well according to claim 5, wherein the flow channels and cross channels have a width of not more than about 0.4 mm.

7. The filter well according to claim 5 or 6, wherein the flow channels and cross channels have a depth of not more than about 0.1 mm.

8. The filter well according to claim 5, wherein the bottom of the flow channels and cross channels has a surface fineness of about 0.4 µm or finer.

9. The filter well according to claim 1, wherein the depth of the flow channels increases gradually towards the outlet.

10. A method for producing a filter well having an inlet portion and an outlet portion and a filter arranged between these, wherein said filter is supported by a support surface in which there is a number of flow channels extending radially towards an outlet, wherein ridges are located between the flow channels, the upper parts of which ridges are in contact with the filter, and have a width of not more than about 0.2 mm, whereby essentially the entire upper surface of the filter becomes active at filtration comprising:

forming plastic in a forming device, wherein the flow channel pattern in the support surface for the filter is formed by a forming part in the forming device, wherein a negative corresponding to the flow channel pattern is made on the surface of the forming part by a photolithographic etching process or by laser machining.

11. The filter well according to claim 6, wherein the flow channels have a width of not more than about 0.1 mm.

12. The filter well according to claim 7, wherein the flow channels have a depth of not more than about 0.05 mm.

13. The method according to claim 10, wherein the flow channels are mutually connected via cross channels.

* * * * *